United States Patent
Goujet (10) Patent No.: US 11,555,522 B2
(45) Date of Patent: Jan. 17, 2023

(54) TORQUE TRANSMISSION SYSTEM HAVING MULTIPLE TORQUE TRANSMISSION PATHWAYS FROM A DRIVING SHAFT TO A DRIVEN SHAFT, AND A VEHICLE

(71) Applicant: AIRBUS HELICOPTERS, Marignane (FR)

(72) Inventor: Damien Goujet, Sausset les Pins (FR)

(73) Assignee: AIRBUS HELICOPTERS, Marignane (FR)

( * ) Notice: Subject to any disclaimer, the term of this patent is extended or adjusted under 35 U.S.C. 154(b) by 136 days.

(21) Appl. No.: 17/071,001

(22) Filed: Oct. 15, 2020

(65) Prior Publication Data

US 2021/0130003 A1 May 6, 2021

(30) Foreign Application Priority Data

Oct. 30, 2019 (FR) ...................................... 1912204

(51) Int. Cl.
*F16D 3/18* (2006.01)
*F16D 9/10* (2006.01)

(52) U.S. Cl.
CPC ............... *F16D 3/185* (2013.01); *F16D 9/10* (2013.01)

(58) Field of Classification Search
CPC .......... B64C 27/12; B64D 35/00; F16D 3/18; F16D 3/185; F16D 9/00; F16D 9/06; F16D 9/08; F16D 9/10; Y10T 403/11; Y10T 403/7035
USPC ........... 403/2, 359.6; 464/32, 157, 158, 159, 464/160, 161
See application file for complete search history.

(56) References Cited

U.S. PATENT DOCUMENTS

| | | | | |
|---|---|---|---|---|
| 3,942,387 | A * | 3/1976 | Stone | B64C 27/12 464/178 |
| 4,201,513 | A * | 5/1980 | Sales | F01D 21/045 416/135 |
| 4,265,099 | A * | 5/1981 | Johnson | F16D 3/72 464/99 |
| 4,276,758 | A * | 7/1981 | Coman | F16D 3/72 464/158 |
| 5,117,704 | A | 6/1992 | Kish et al. | |

(Continued)

FOREIGN PATENT DOCUMENTS

| | | |
|---|---|---|
| DE | 69106215 T2 | 5/1995 |
| EP | 0913600 A1 | 5/1999 |
| WO | 2011132706 A1 | 10/2011 |

OTHER PUBLICATIONS

French Search Report for French Application No. FR1912204, Completed by the French Patent Office, dated Jun. 16, 2020, 9 pages.

*Primary Examiner* — Josh Skroupa
(74) *Attorney, Agent, or Firm* — Brooks Kushman P.C.

(57) ABSTRACT

A torque transmission system having multiple torque transmission pathways from a driving shaft to a driven shaft. The driving shaft extends from a lower segment to an upper segment via an intermediate segment, the driven shaft extending from a first segment to a second segment. The transmission system includes a nominal spline coupling that is operational in a nominal operating mode, a backup spline coupling between the driving shaft and the driven shaft that is inactive in the nominal operating mode, and a backup radial guide device between the driving shaft and the driven shaft that is inactive in the nominal operating mode.

20 Claims, 6 Drawing Sheets

(56) References Cited

U.S. PATENT DOCUMENTS

| | | | | |
|---|---|---|---|---|
| 5,407,386 A * | 4/1995 | Kish | ............... | F16D 3/72 |
| | | | | 464/160 |
| 6,428,443 B1 | 8/2002 | Dischler | | |
| 7,507,180 B2 | 3/2009 | Robuck | | |
| 7,736,083 B2 * | 6/2010 | Lescure | ............... | F16D 1/101 |
| | | | | 403/359.6 |
| 8,986,127 B2 * | 3/2015 | Berthalon | ............... | F16D 9/10 |
| | | | | 464/158 |
| 10,267,367 B2 * | 4/2019 | Le Ru | ............... | F16D 9/10 |

\* cited by examiner

TORQUE TRANSMISSION SYSTEM HAVING MULTIPLE TORQUE TRANSMISSION PATHWAYS FROM A DRIVING SHAFT TO A DRIVEN SHAFT, AND A VEHICLE

CROSS-REFERENCE TO RELATED APPLICATIONS

This application claims priority to French patent application No. FR 19 12204 filed on Oct. 30, 2019, the disclosure of which is incorporated in its entirety by reference herein.

BACKGROUND OF THE INVENTION

(1) Field of the Invention

The present invention relates to a torque transmission system having multiple torque transmission pathways from a driving shaft to a driven shaft, and also relates to a vehicle including such a system. The vehicle may be an aircraft and optionally a rotorcraft.

(2) Description of Related Art

For example, a rotorcraft may include a power transmission main gearbox for causing a lift rotor to move in rotation by means of at least one engine or motor. The main gearbox is provided with a system making it possible to transfer movement from a rotary driving member to a rotary driven member.

In an example, a main gearbox has at least one inlet gear, each inlet gear being connected via a mechanical drive system to at least one engine or motor. In addition, the main gearbox includes a rotation speed reduction stage. The main gearbox then includes a torque transmission system for transmitting torque from each inlet gear to the rotation speed reduction stage. Such a torque transmission system is sometimes referred to more simply as a "transmission system" below.

Such a transmission system includes a wheel that is sometimes referred to as a "large wheel" or as a "combiner wheel" and that is mounted to move in rotation about an axis of rotation. Each inlet gear then meshes with the large wheel to drive it in rotation about the axis of rotation. The large wheel is constrained to move with a driving shaft. The driving shaft extends along an axis of rotation from a lower guide segment to an upper guide segment while going through an intermediate segment carrying the large wheel. The large wheel is then arranged in elevation along the axis of rotation on the intermediate segment.

In order to guide the driving shaft, the main gearbox may, for example, have an upper bearing arranged radially facing the axis of rotation between the upper guide segment and a support. The main gearbox may also have a lower bearing arranged radially facing the axis of rotation between the lower guide segment and a support. For example, the lower bearing and/or the upper bearing each comprise a ball bearing or a roller bearing.

In addition, a driven shaft extends partially inside the driving shaft. The driving shaft is then equipped with a mechanical coupling having splines that mesh with complementary splines on the driven shaft so that the large wheel rotating about the axis of rotation causes the driven shaft to rotate about said axis of rotation. The splines are arranged in elevation between the lower guide segment and the large wheel.

Furthermore, the driven shaft is constrained to move in rotation with a wheel that is usually referred to as a "sun wheel" of the rotation speed reduction stage. In addition, the rotation speed reduction stage has "planet wheels" that are constrained to move with a planet, carrier and has an outer ring. Each planet wheel thus has teeth that mesh with teeth in the outer ring and on the sun wheel. Finally, the planet carrier is constrained to move in rotation with a rotor mast.

An inlet gear rotating then drives the large wheel, the driving shaft, the driven shaft, the sun wheel, the planet wheels and the planet carrier jointly in rotation about the axis of rotation.

Such a torque transmission system is satisfactory. However, accidental breakage of a bearing or of one of the segments of the driving shaft co-operating with a bearing can result in the driving shaft becoming misaligned relative to the axis of rotation, and in the system jamming.

Documents WO 2011/132706 A1, DE 691 06 215 T2, U.S. Pat. No. 6,428,443 B1, EP 0 913 600 A1 and U.S. Pat. No. 7,507,180 B2 are known.

In particular, Document WO 2011/132706 discloses a system having a driving shaft and a driven shaft coupled together via splines and a screw.

BRIEF SUMMARY OF THE INVENTION

An object of the present invention is then to propose an alternative torque transmission system aiming to limit the risks of jamming by the driving shaft being offset from the axis of rotation as a result of various breakages.

To this end, the invention provides a torque transmission system comprising a driving shaft and a driven shaft, said driving shaft being hollow and mounted to move in rotation about an axis of rotation, said driving shaft extending longitudinally along the axis of rotation upwards from bottom to top in an elevation direction from a lower segment to an upper segment via an intermediate segment, said driven shaft comprising longitudinally a first segment extended by a second segment, said first segment being arranged inside the driving shaft, said second segment being arranged outside the driving shaft, and said transmission system further comprising an upper bearing co-operating with the upper segment and a lower bearing co-operating with the lower segment.

Said transmission system further comprises:

a nominal spline coupling comprising main splines on the intermediate segment that mesh with main splines on the first segment in a nominal operating mode without any failure;

a backup spline coupling between the driving shaft and the driven shaft, the backup spline coupling being arranged above the nominal spline coupling in said elevation direction and in view of the axis of rotation, and the backup spline coupling being inactive in the nominal operating mode; and a backup radial guide device between the driving shaft and the driven shaft, the backup radial guide device being arranged below the nominal spline coupling in said elevation direction and in view of the axis of rotation, and the backup radial guide device being inactive in the nominal operating mode.

The terms "bottom" and "top", "upwards", and "above" and "below" are relative terms to be considered relative to a direction along the axis of rotation that is referred to as the "elevation direction". This direction goes from the lower segment towards the upper segment. A "top" element is situated in a plane that is orthogonal to the axis of rotation and that is above a plane that is orthogonal to the axis of rotation and that contains a "bottom" element relative to said direction. This direction may, for example, be substantially opposite from gravity when the system is arranged on an aircraft standing on flat ground.

The term "inactive" means that the member in question does not have any action, consistent with the usual definition given to that term.

Therefore, in a nominal operating mode, the driving shaft bears against the lower bearing and against the upper bearing. The driving shaft transmits torque to the driven shaft via the nominal spline coupling. The backup spline coupling and the backup radial guide device are inactive and therefore inoperative so as not to generate multiple points via which torque is transmitted during the nominal operating mode. This characteristic can make it possible to keep the loads under control, to avoid statically indeterminate situations and/or to avoid degrading the backup spline coupling and the backup radial guide device in order to keep them intact for when they might be needed. In particular, the backup radial guide device does not exert any force on the driving shaft and on the driven shaft during the nominal operating mode.

In a degraded operating mode, in the event a portion of the driving shaft breaks, the backup spline coupling and/or the backup radial guide device then become operational.

For example, if the driving shaft breaks between the nominal spline coupling and the backup spline coupling, the driving shaft can transmit torque to the driven shaft via the backup spline coupling rather than via the nominal spline coupling.

In another example, if the lower segment breaks, the driving shaft may remain guided radially by the backup radial guide device.

Therefore, the torque transmission system can remain operational by transmitting torque from the driving shaft to the driven shaft either via the backup spline coupling or via the nominal spline coupling as a function of the situation. In addition, the backup radial guide device can become operational in certain accidental situations.

The torque transmission system thus has multiple torque transmission pathways and multiple guide members for optimizing how it operates.

The torque transmission system may also include one or more of the following characteristics.

Thus, the intermediate segment may include a toothed wheel.

The driving shaft may thus be caused to move in rotation via its toothed wheel. For example, an inlet gear may mesh with the toothed wheel to set the torque transmission system in motion.

In an aspect, the backup spline coupling may be arranged longitudinally between the toothed wheel and the upper segment.

The backup spline coupling thus makes it possible to transmit torque from a portion of the driving shaft that is driven by the wheel to the driven shaft even in the event the segment including the nominal spline coupling breaks.

In an aspect, the intermediate segment may include an upper coupling segment and a lower coupling segment, said upper coupling segment being constrained to move with the lower coupling segment and with the upper segment, said lower coupling segment being constrained to move with the lower segment, and said backup spline coupling co-operating with said upper coupling segment.

In the event the intermediate segment breaks between the upper coupling segment and the lower coupling segment, the backup spline coupling becomes operational to transmit torque to the driven shaft.

In an aspect, the upper coupling segment and the upper segment may form a first common, single piece, and said lower coupling segment and said lower segment may form a second common, single piece, said upper coupling segment being fastened by a mechanical fastening to the lower coupling segment.

The expression "common, single piece" means a mechanical part made in one piece.

For example, the first piece is welded to the second piece to form a one-piece driving shaft optionally including the above-mentioned wheel. In the event the weld breaks, the backup spline coupling becomes operational so as to transmit torque to the driven shaft.

In an aspect, the backup spline coupling may comprise first backup splines constrained to move with the driving shaft or with the driven shaft, the backup spline coupling further comprising second backup splines constrained to move with that one of the driving shaft or driven shaft that does not have the first backup splines, circumferential clearance separating the first backup splines from the second backup splines in the nominal operating mode.

The circumferential clearance thus represents a gap that makes it possible to avoid contact between the first backup splines and the second backup splines during the nominal operating mode.

The circumferential clearance may be dimensioned to be less than a high threshold in order to guarantee operation of the backup spline coupling for a given time during a degraded operating mode and greater than a low threshold in order to generate acceptable misalignments during the degraded operating mode. The low threshold is less than the high threshold. Indeed, such a misalignment generates detectable degradations, such as, for example, vibration that can be measured by usual methods and/or generation of swarf that can be identified by a swarf detector. Therefore, the backup spline coupling enables the system to operate in a degraded mode while also allowing a slight misalignment making it possible to detect the occurrence of the degraded mode.

To this end, the first backup splines have, for example, a tooth thickness less than the tooth thickness of the second backup splines.

Each backup spline extends circumferentially between two sides and radially from a base to a tip that is substantially flat or indeed curved. Consistent with the convention relating to sets of teeth, the expression "tooth thickness" then designates the smallest distance between two sides of the backup spline, e.g. at its tip.

The second backup splines have a tooth thickness that is less than the tooth thickness of the first backup splines so as to avoid contact between them and so as to avoid torque transmission during the nominal operating mode.

Optionally, each backup spline may be a spline having rectilinear sides.

In an aspect, the first backup splines may be constrained to move with the driving shaft, said second backup splines being constrained to move with the driven shaft.

In an aspect, with it being possible for any two adjacent ones of said first backup splines to be interconnected via a first end-wall and with it being possible for any two adjacent ones of said second backup splines to be interconnected by a second end-wall, in the nominal operating mode it is possible that no first backup spline touches a second backup spline or a second end-wall, and that no second backup spline touches a first end-wall.

In an aspect, with it being possible for any two adjacent ones of said first backup splines to be interconnected via a first end-wall and with it being possible for any two adjacent ones of said second backup splines to be interconnected via a second end-wall, in the nominal operating mode: said circumferential clearance separates a side of each first backup spline from an adjacent second backup spline, a first radial gap separates each second backup spline from a respective first end-wall and a second radial gap separates each first backup spline from a respective second end-wall.

The driving shaft and the driven shaft are thus not in contact at the level of the backup spline coupling during the nominal operating mode. Conversely, in a degraded operating mode, the first backup splines may drive the second backup splines in rotation by means of a shape interference fit.

In an aspect, said main splines on the intermediate segment and on the first segment may comprise splines having rectilinear sides.

In an aspect, the backup radial guide device may provide holding in position radially only, the torque transmission system already having two torque transmission pathways.

In an aspect, the backup radial guide device comprises a ring of the driven shaft and at least one bearing face of the driving shaft, said at least one bearing face being separated from the ring in the nominal operating mode.

In a first variant, the backup radial guide device may have a single annular bearing face.

In a second variant, the backup radial guide device has multiple guide splines, each of which extends radially from a base to a tip, each tip forming a bearing face. The guide splines are not designed to serve to transmit torque. The guide splines may be in alignment with the nominal splines for facilitating manufacturing of the driving shaft.

In an aspect, the torque transmission system may include a latch that longitudinally locks the driving shaft relative to the driven shaft as stationary, e.g. substantially at the nominal spline coupling.

Such a latch may tend to couple together axially the driving shaft and the driven shaft as stationary.

In addition, a main gearbox may include a torque transmission system of the invention.

For example, the driven shaft is constrained to move with a sun wheel of an epicyclic rotation speed reduction stage.

In addition, a vehicle may include a torque transmission system of the invention, optionally inside a main gearbox.

BRIEF DESCRIPTION OF THE DRAWINGS

The invention and its advantages appear in greater detail from the following description of examples given by way of illustration with reference to the accompanying figures, in which:

FIGS. 3-3C illustrate a torque transmission system of the invention in a nominal operating mode;

FIGS. 5-5C illustrate a torque transmission system of the invention in a degraded operating mode in the presence of a breakage at the upper segment of the driving shaft;

FIGS. 6-6C illustrate a torque transmission system of the invention in a degraded operating mode in the presence of a breakage of the driving shaft above a nominal spline coupling; and FIGS. 7-7C illustrate a torque transmission system of the invention in a degraded operating mode in the presence of a breakage of the driving shaft below a nominal spline coupling.

DETAILED DESCRIPTION OF THE INVENTION

Elements present in more than one of the figures are given the same references in each of them.

Three mutually orthogonal axes X, Y, and Z are shown in some of the figures.

The third axis Z is said to be "longitudinal". The term "longitudinal" and the term "axial", or indeed the expression "in elevation" are relative to any axis parallel to the first axis X.

The second axis Y and the first axis X are said to be "radial in elevation". The term "radial" is relative to any axis orthogonal to the first axis X.

Figure 1:
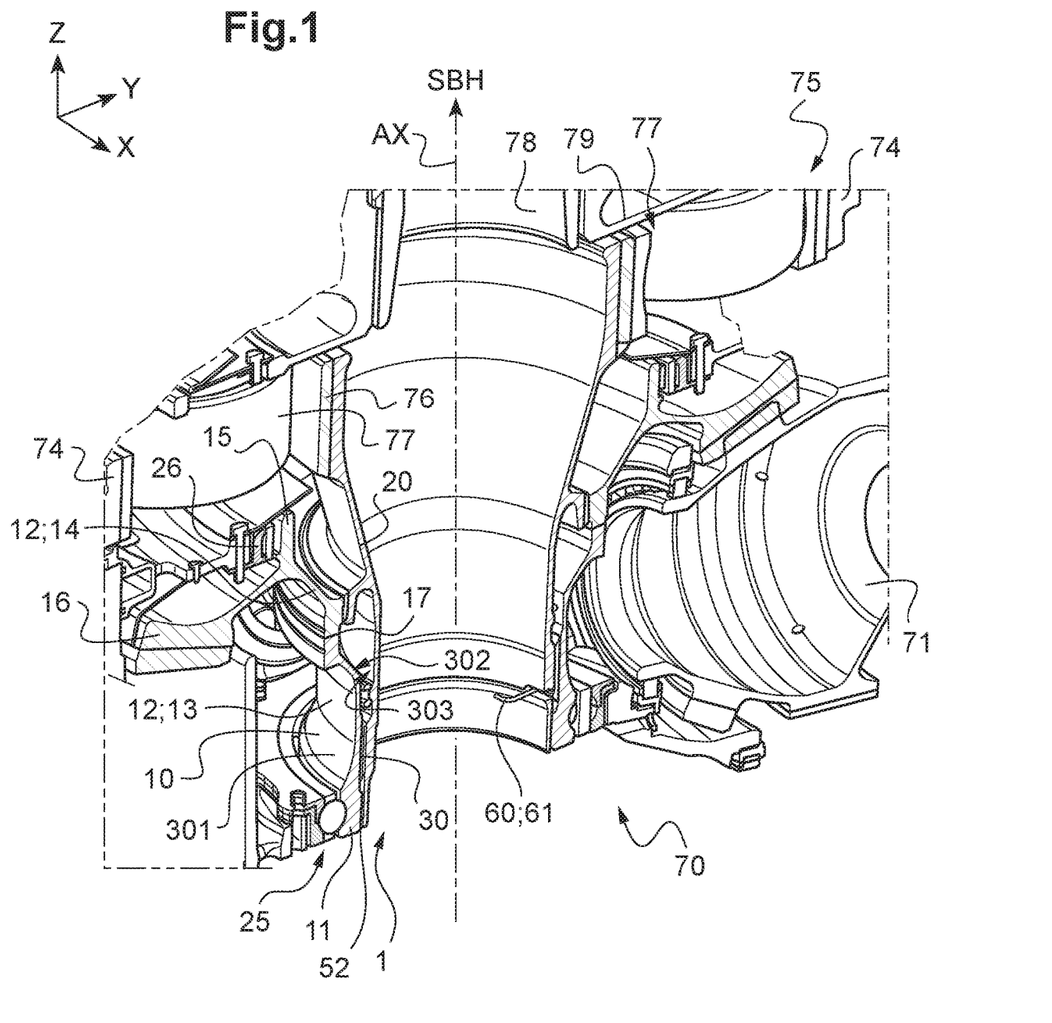
FIG. 1 is a view of a torque transmission system of the invention.

FIG. 1 shows a torque transmission system 1 of the invention having multiple torque transmission pathways.

This transmission system 1 has a driving shaft 10 and a driven shaft 20 that are both mounted to move in rotation about an axis of rotation AX under normal conditions. The driving shaft 10 is connected to the driven shaft 20 via multiple couplings.

As shown in FIG. 1, the transmission system 1 may be arranged in a main gearbox 70. For example, a function of the transmission system 1 is to transmit motion from at least one inlet gear 71 to an epicyclic speed reduction stage 75. For example, each inlet gear 71 meshes with a combiner wheel 16 of the driving shaft 10. In the example shown, the driven shaft 20 is then constrained to move with a sun wheel 76 of the epicyclic speed reduction stage 75. The sun wheel 76 may be fastened to the driven shaft 20 or be an integral part of it. The epicyclic speed reduction stage 75 includes planet wheels 77 that engage with the sun wheel 76 and with a toothed ring 74, each planet wheel 77 being disposed radially between the sun wheel 76 and the toothed ring 74. The planet wheels 77 are carried by a planet carrier 79 that is constrained to move with a rotor mast 78.

Figure 2:
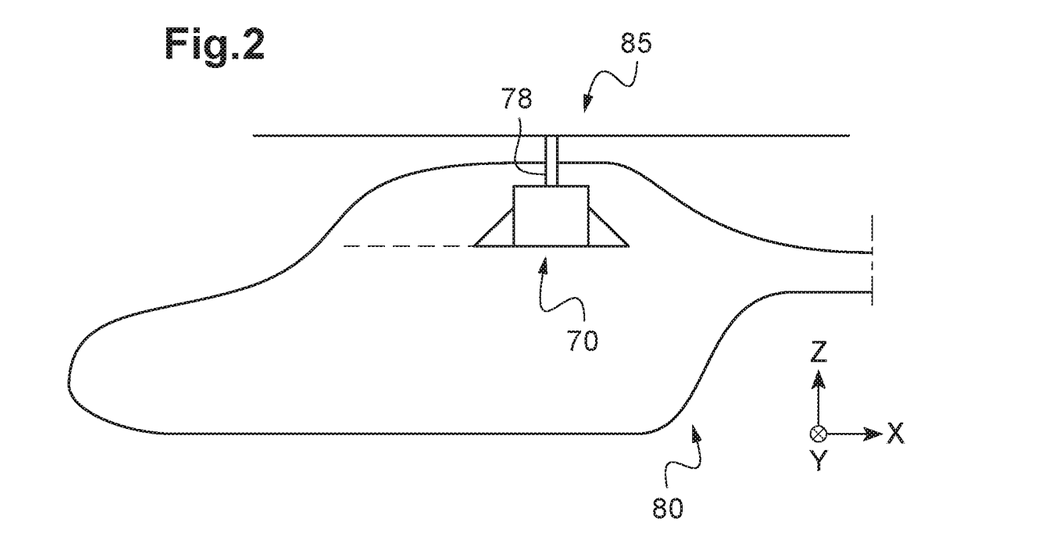
FIG. 2 is a view of an aircraft having a torque transmission system of the invention.

As shown in FIG. 2, the transmission system 1 may be arranged in a vehicle 80. For example, the vehicle 80 is an aircraft provided with a rotor 85 that participates in providing lift for it and/or in providing propulsion for it. For example, the transmission system 1 may be arranged in a main gearbox 70 that drives the rotor 85 with its rotor mast 78.

With reference, once again, to FIG. 1, and independently of the arrangement of the transmission system 1, the driving shaft 10 is hollow in its center. Said driving shaft 10 may be circularly symmetrical about the axis of rotation AX. The driving shaft 10 then extends radially about the axis of rotation AX and longitudinally along the axis of rotation AX.

The driving shaft 10 is guided in rotation by a lower bearing 25 and by an upper bearing 26 that surround said driving shaft 10. The terms "lower" and "upper" are relative terms to be considered with regard to an elevation direction SBH along the axis of rotation AX. In the example shown, the lower bearing 25 comprises a ball bearing arranged between an outside face 301 of the driving shaft 10 and a support, while the upper bearing 26 comprises a roller bearing arranged between said outside face 301 of the driving shaft 10 and a support. Such an outside face 301 is referred to by convenience as a "driving outside face 301" so as to be readily identified.

In another aspect, longitudinally along the axis of rotation AX, the driving shaft 10 has a lower segment 11 extended by an intermediate segment 12, which intermediate segment 12 is itself extended by an upper segment 15. Going upwards from bottom to top in the elevation direction SBH of the axis of rotation AX, the driving shaft 10 thus has, in succession, the lower segment 11, the intermediate segment 12, and then the upper segment 15. The terms "bottom" and "top" are relative terms to be considered with regard to the elevation direction SBH, an element situated at the "top" being situated above an element situated at the "bottom" in the elevation direction. The lower segment 11 represents a segment of the driving shaft 10 that bears radially against the lower bearing 25 while the upper segment 15 represents a segment of the driving shaft 10 that bears radially against the upper bearing 26. In addition, the upper segment may have a shoulder forming an axial abutment 800 preventing the driving shaft from moving in translation upwards from bottom to top by coming into contact with the upper bearing 26.

Optionally, the driving shaft 10 may be made in one piece or be made up of a plurality of pieces constrained to move together, this constraining optionally being irreversible apart from accidental breakage.

For example, the lower segment 11, the intermediate segment 12, and then the upper segment 15 may comprise three respective pieces that are welded or otherwise bonded together, the intermediate segment 12 being welded to the lower segment 11 and to the upper segment 15.

In another example, the intermediate segment 12 comprises an upper coupling segment 14 and a lower coupling segment 13. The upper coupling segment 14 is then constrained to move with the lower coupling segment 13 and with the upper segment 15, while the lower coupling segment 13 is constrained to move with the lower segment 11 as well as with the upper coupling segment 14. Thus, the driving shaft 10 comprises, going upwards from bottom to top, the lower segment 11, the lower coupling segment 13, the upper coupling segment 14, and then the upper segment 15.

Optionally, the lower segment 11 and the lower coupling segment 13 are two segments of a first common single piece, while the upper coupling segment 14 and the upper segment 15 are two segments of a second common single piece. The lower segment 13 is then constrained to move with the upper coupling segment 14 via a mechanical fastening 17 such as, for example, a weld.

In other aspect, the driving shaft 10 may be provided with a toothed wheel 16. For example, the intermediate segment 12 is provided with said toothed wheel 16, optionally arranged just at the level of the interface with the upper segment 15. In another example, the intermediate segment 12 is constrained to move with the toothed wheel 16 by usual means. The toothed wheel 16 may have teeth that are present substantially in a plane orthogonal to the axis of rotation AX.

In another aspect, the driven shaft 20 may be hollow at its center and/or may be circularly symmetrical about the axis of rotation AX. Longitudinally going upwards from bottom to top, the driven shaft 20 comprises a first segment 21 extended by a second segment 22 along the axis of rotation AX. The first segment 21 is arranged within the driving shaft 10 while the second segment 22 projects longitudinally from the upper segment 15 of the driving shaft 10. The first segment 21 then has a driven outside face 303 radially facing a driving inside face 302 of the driving shaft 10.

In addition, the transmission system 1 has three torque transmission and/or holding/guiding sub-systems between the driving shaft 10 and the driven shaft 20, each sub-system possibly being referred to as a "coupling".

Figures 3, 3A, 3B, 3C:
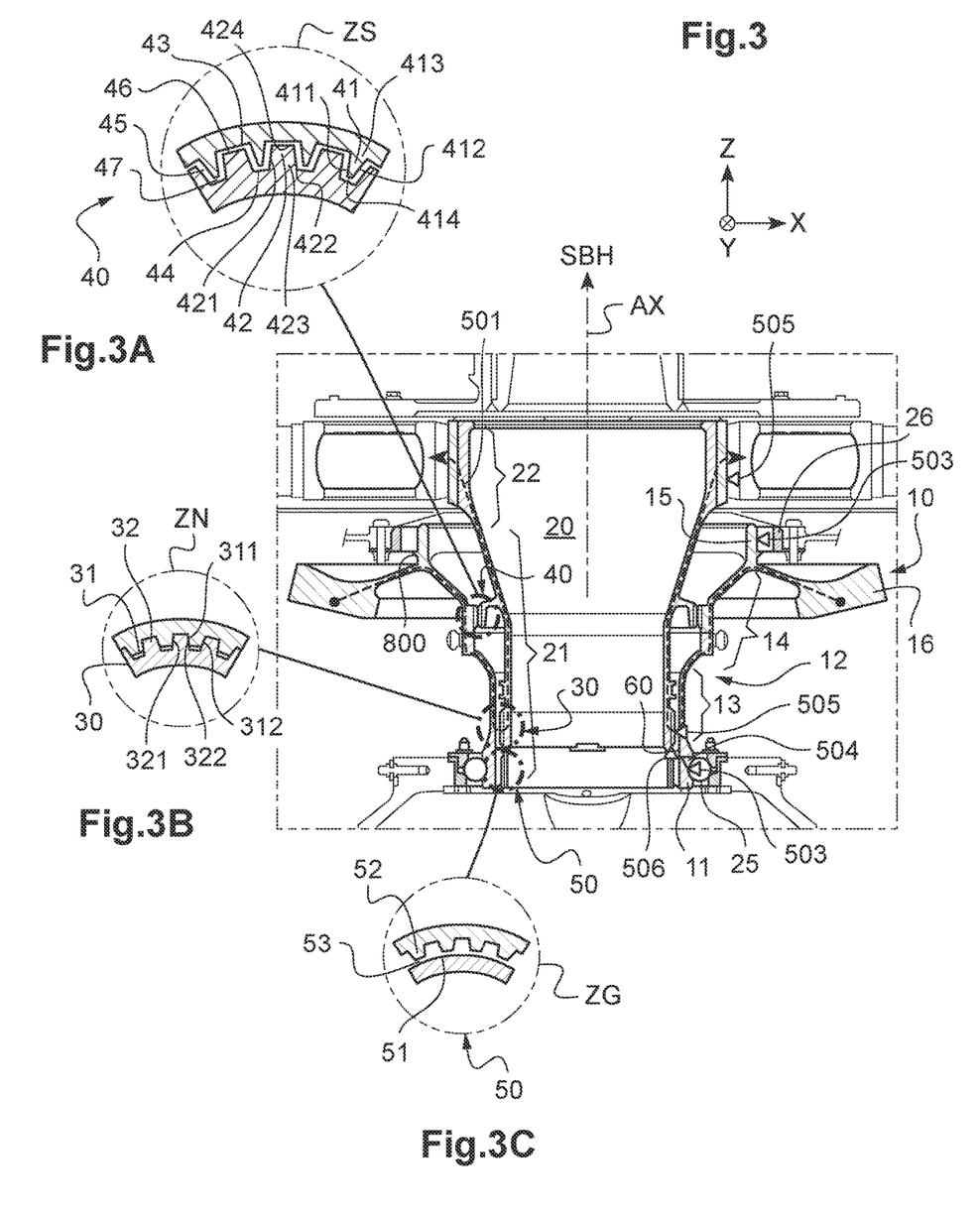

With reference to FIGS. 3-3C, the transmission system 1 has a first spline coupling referred to as a "nominal spline coupling 30". This nominal spline coupling 30 thus comprises first main splines 31 that mesh with second main splines 32 in a nominal operating mode, namely in an operating mode without any failure.

The first main splines 31 are constrained to move with the driving shaft 10, and in particular with the intermediate segment 12 thereof. The first main splines 31 may be disposed on a ring constrained to move with the driving shaft 10 or they may be integral parts of the driving shaft 10. In particular, the first main splines 31 may optionally be located on the lower coupling segment 13. The first main splines 31 may comprise splines having rectilinear sides and/or may be straight splines that extend parallel to the axis of rotation AX. Each first main spline 31 extends circumferentially between two sides and radially to a tip.

The second main splines 32 are constrained to move with the driven shaft 20, and in particular with the first segment 21 thereof. The second main splines 32 may be disposed on a ring constrained to move with the driven shaft 20 or they may be integral parts of the driven shaft 20. The second main splines 32 may comprise splines having rectilinear sides and/or may be straight splines that extend parallel to the axis of rotation AX. Each second main spline 32 extends circumferentially between two sides and radially to a tip.

The first main splines 31 and the second main splines 32 may be complementary or indeed identical. In the nominal operating mode, at least one or indeed each side of each first main spline 31 is circumferentially in contact with a side of a second main spline 32.

In addition, the first main splines are radially in contact with the second main splines.

For example, as in the example shown, the tip of each first main spline 31 is radially in contact with a wall interconnecting two adjacent second main splines 32, and the tip of each second main spline 32 is radially in contact with a wall interconnecting two adjacent first main splines 31. In another example, side centering is possible, the first main splines 31 being radially in contact with the second main splines 32 via the sides of said splines only.

Furthermore, with reference to FIGS. 3-3C, the transmission system 1 has a second spline coupling referred to as a "backup spline coupling 40" to distinguish it, in particular, from the nominal spline coupling 30. The term "backup" is used to describe the second coupling because the backup spline coupling 40 is inactive in the nominal operating mode. Thus, in the absence of a failure, no torque is transmitted via the backup spline coupling 40 between the driving shaft 10 and the driven shaft 20.

Like the nominal spline coupling 30, the backup spline coupling 40 is a spline coupling so that, if necessary, it is possible to transmit torque from the driving shaft 10 to the driven shaft 20.

The backup spline coupling 40 is arranged above the nominal spline coupling 30 in the elevation direction SBH. For example, the backup spline coupling 40 is optionally arranged longitudinally in the elevation direction SBH between the nominal spline coupling 30 and the toothed wheel 16 or the upper segment 15, or indeed, for example, optionally at the upper coupling segment 14.

The backup spline coupling 40 thus comprises first backup splines 41 that are suitable for meshing with second backup splines 42 in a degraded operating mode.

In the example shown, the first backup splines 41 are constrained to move with the driving shaft 10 and the second backup splines 42 are constrained to move with the driven shaft 20. The reverse is possible.

In the example shown, said first backup splines 41 are integral parts of the driving shaft 10 but they may be disposed on a ring that is constrained to move with the driving shaft 10. In particular, the first main splines 41 may optionally be located on the upper coupling segment 14. For example, the first backup splines 41 are arranged on a shoulder of the driving shaft 10. The first backup splines 41 may comprise splines having rectilinear sides and/or may be straight splines that extend parallel to the axis of rotation AX.

In addition, the second backup splines 42 are integral parts of the driven shaft 20, but they may be disposed on a ring constrained to move with the driven shaft 20. For example, the second backup splines 42 are arranged on a shoulder of the driven shaft 20. The second backup splines 42 may comprise splines having rectilinear sides and/or may be straight splines that extend parallel to the axis of rotation AX.

In another aspect, the first backup splines 41 and the second backup splines 42 may be different.

Figure 4:
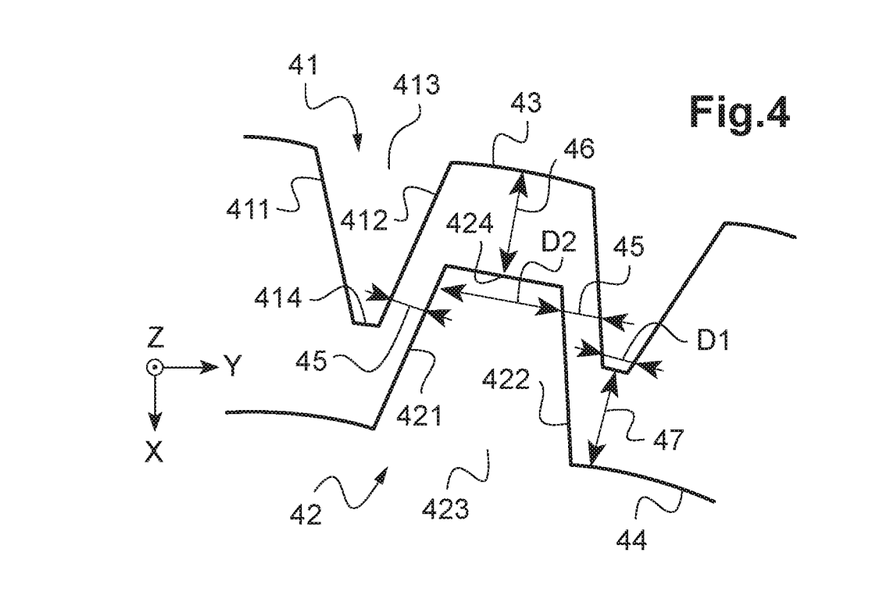
FIG. 4 is a fragmentary view of a backup spline coupling in a nominal operating mode.

With reference to FIG. 4, two adjacent first backup splines 41 are interconnected via a first end-wall 43. For example, the first end wall 43 is a wall of the driving shaft 10. In addition, each first backup spline 41 extends in view of the axis of rotation AX circumferentially between two first sides 411, 412 and radially from a first base 413 to a first tip 414.

Similarly, two adjacent second splines 42 are interconnected via a second end-wall 44. For example, the second end-wall 44 is a wall of the driven shaft 20. In addition, each second backup spline 42 extends circumferentially between two second sides 421, 422 and radially from a second base 423 to a second tip 424.

In the nominal operating mode, no first backup spline 41 then touches a second backup spline 42 and a second end-wall 44. In addition, no second backup spline 42 touches a first end-wall 43.

In a degraded operating mode, the backup splines have radial contact.

For example, a first tip 414 may bear against a second end-wall 44 and a second tip 424 may bear against a first end-wall 43 for providing guiding, and/or a first side 412 may bear against a second side 421 for transmitting torque.

In another example, side centering is performed.

In the example shown in FIG. 4, during the nominal operating mode, circumferential clearance 45 separates each first side 411, 412 of each first backup spline 41 from a respective second side of a second backup spline 42 that is adjacent to said first backup spline 41.

For this purpose, the first backup splines 41 may have a tooth thickness less than the tooth thickness of the second backup splines 42. For example, the first distance D1 between two first sides 411, 412 at a first tip is less than the second distance D2 between two second sides 421, 422 at a second tip 424. In another example, the first distance D1 may be equal to the second distance D2.

In an aspect, a first radial gap 46 may separate each second backup spline 42 from each first end-wall 43, and a second radial gap 47 separates each first backup spline 41 from each second end-wall 44.

Furthermore, and with reference to FIGS. 3-3C, the transmission system 1 further comprises a third coupling referred to as a "backup radial guide device 50". The function of the backup radial guide device is not to transmit torque, but rather it is to provide positioning of the driving shaft 10 and/or of the driven shaft 20 if necessary, at least radially. The backup radial guide device 50 is inactive in the nominal operating mode.

The backup radial guide device 50 is arranged below the nominal spline coupling 30 in the elevation direction SBH. For example, the backup radial guide device 50 is optionally arranged at the lower segment 11.

In the example shown in FIGS. 3-3C, the backup radial guide device 50 comprises a ring 51 on the driven shaft 20, which ring co-operates, if necessary, with at least one bearing face 52 of the driving shaft 10.

In a first example, the lower segment 11 is provided with internal splines facing the axis of rotation AX. The internal splines optionally extend in alignment with the first main splines 31. Each tip of an internal spline forms a bearing face 52.

In a second example shown in FIG. 1, the driving shaft 10 has a ring provided with an annular bearing face 52.

During the nominal operating mode and with reference, once again, to FIGS. 3-3C, each bearing face 52 is separated from the ring 51 by an annular gap.

In another aspect, the torque transmission system 1 may include a latch 60 for constraining the driving shaft 10 and the driven shaft 20 to move in translation with each other along the axis of rotation AX.

In the example shown in FIG. 1, the latch 60 is in the form of an L-shaped catch constrained to move with the moving shaft 10. The catch 61 penetrates into an oblong hole in the driven shaft 20.

For example, the latch 60 may be positioned between the nominal spline coupling 30 and the lower segment 11.

FIGS. 3, 5, 6 and 7 show how the transmission system 1 of the invention operates. FIGS. 3-3C, 5-5C, 6-6C and 7-7C show enlarged zones ZS, ZN, ZG for the purpose of showing how the various couplings operate.

In particular, FIGS. 3-3C show the nominal operating mode. During said nominal operating mode, the first main splines 31 mesh with the second main splines 32. Conversely, no first backup spline 41 touches a second backup spline 42 and a second end-wall 44. In addition, no second backup spline 42 touches a first end-wall 43. Similarly, the ring 51 of the backup radial device 50 does not touch any bearing face 52.

Therefore, the driving shaft 10 transmits torque to the driven shaft 20 via the nominal spline coupling 30 as indicated by the dashed line 501, the backup spline coupling 40 and the backup radial guide device 50 being inactive. In addition, the driving shaft 10 is guided in rotation about the axis of rotation AX by the lower bearing 25 and by the upper bearing 26 as indicated by the arrows 503, and longitudinally along the axis of rotation AX by the lower bearing 25 as indicated by the arrow 504. The driven shaft 20 is guided in rotation about the axis of rotation AX by the nominal spline coupling 30 and by the planet wheels 77 as indicated by the arrows 505, and longitudinally along the axis of rotation AX by the latch 60 as indicated by the arrow 506.

Figures 5, 5A, 5B:
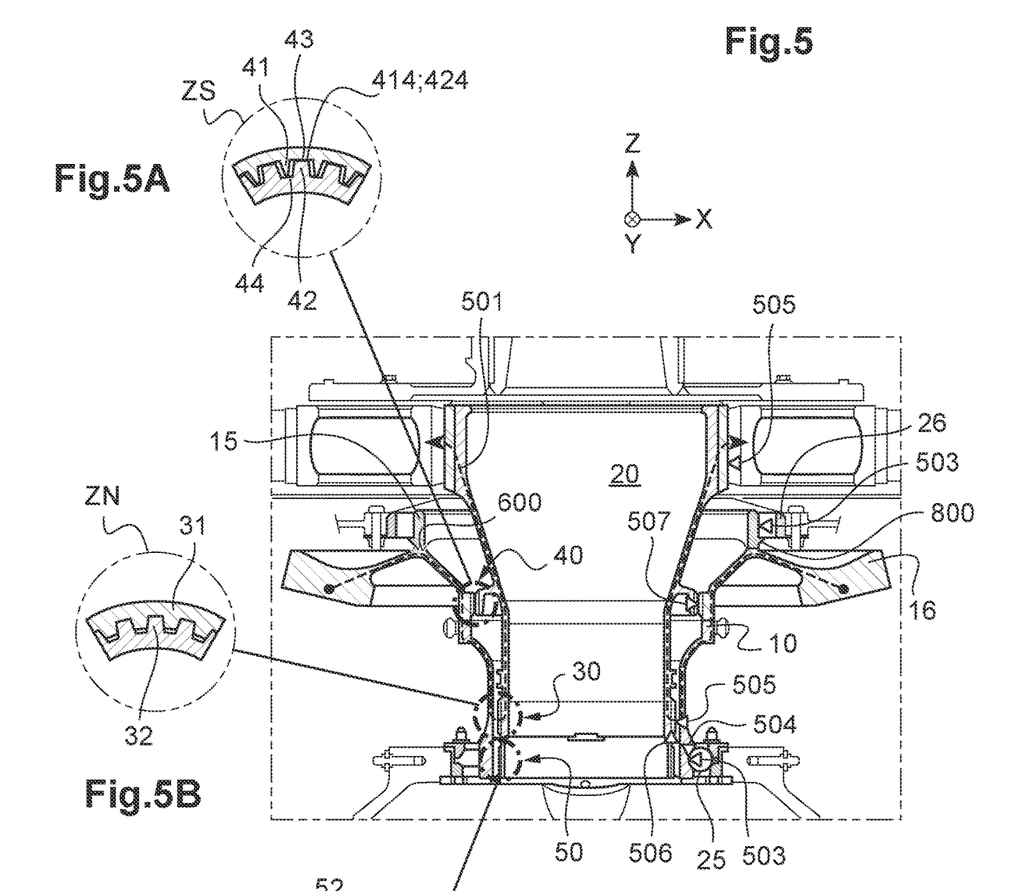
Figure 5C:
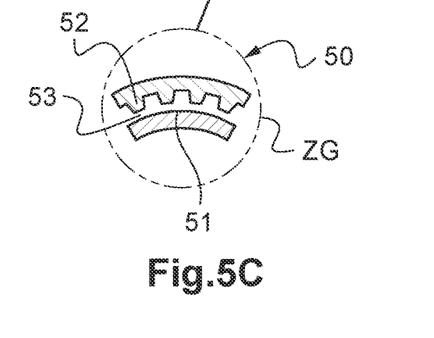

FIGS. 5-5C show a first degraded operating mode resulting from a breakage 600 of the driving shaft 10 between the upper segment 15 and the wheel 16. Said breakage 600 affects the radial guiding of the driving shaft 10. During said first degraded operating mode, the first main splines 31 continue to mesh with the second main splines 32. Conversely, the breakage 600 can lead to the driving shaft 10 being offset. As a result, no first backup spline 41 touches a second backup spline 42 but some first backup splines 41 bear against second end-walls 44 or against the corresponding sides, and some second backup splines 42 bear against first end-walls 43 for providing radial support. Alternatively, radial contact via the sides of the first backup splines 41 and of the second backup splines 42 is established. The backup radial guide device 50 remains inactive, the ring 51 of the backup radial guide device 50 not touching any bearing face 52.

Therefore, the driving shaft 10 transmits torque to the driven shaft 20 via the nominal spline coupling 30 as indicated by the dashed line 501. In addition, the driving shaft 10 is guided in rotation about the axis of rotation AX by the lower bearing 25 and optionally by the upper bearing 26 as well as by the backup spline coupling 40 as indicated by the arrow 507. The driving shaft 10 is guided longitudinally along the axis of rotation AX by the lower bearing 25 as indicated by the arrow 504. The driven shaft 20 is guided in rotation about the axis of rotation AX by the nominal spline coupling 30 and by the planet wheels 77 also as indicated by the arrows 505, and longitudinally along the axis of rotation AX by the latch 60 as indicated by the arrow 506.

Figures 6, 6A, 6B, 6C:
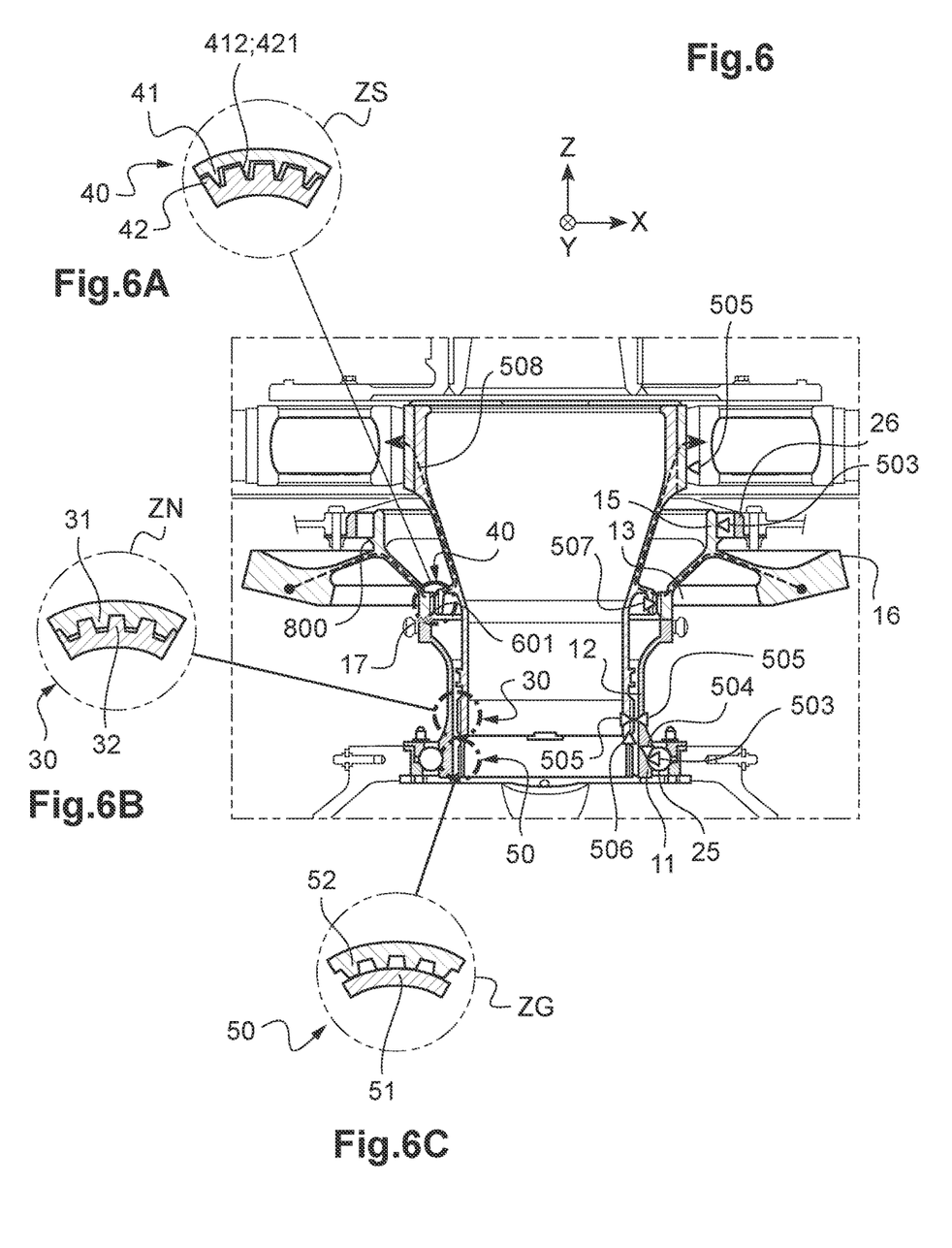

FIGS. 6-6C show a second degraded operating mode resulting from a breakage 601 of the driving shaft 10 between the upper coupling segment 14 and the lower coupling segment 13. Said breakage 601 affects the guiding of the driving shaft 10. During said second degraded operating mode, the first main splines 31 continue to mesh with the second main splines 32 but they cannot transmit any torque. Therefore, the first backup splines 41 mesh with the second backup splines 42. The backup radial guide device becomes active, the ring 51 of the backup radial device 50 touching at least one bearing face 52 at each instant. The nominal spline coupling may also provide radial guiding.

Therefore, the driving shaft 10 transmits torque to the driven shaft 20 via the backup spline coupling 40 as indicated by the dashed line 508. In addition, the driving shaft 10 is guided in rotation about the axis of rotation AX by the upper bearing 26 and optionally by the lower bearing 25 as indicated by the arrows 503, by the backup spline coupling 40 as indicated by the arrow 507, and by the backup radial guide device 50. The driving shaft 10 is optionally guided longitudinally along the axis of rotation AX by the lower bearing 25 as indicated by the arrow 504. The driven shaft 20 is guided in rotation about the axis of rotation AX by the nominal spline coupling 30 and by the planet wheels 77 or indeed by the backup spline coupling 40 optionally as indicated by the arrows 505, and longitudinally along the axis of rotation AX by the latch 60 as indicated by the arrow 506.

Figures 7, 7A, 7B:
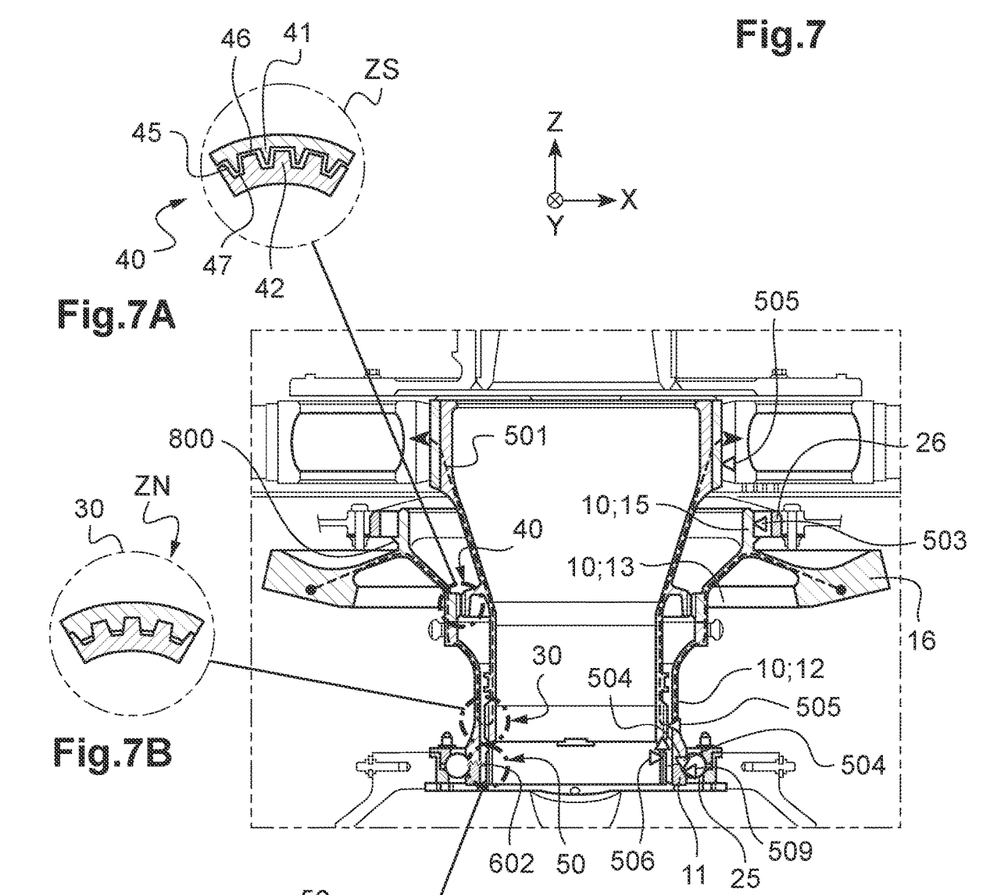
Figure 7C:
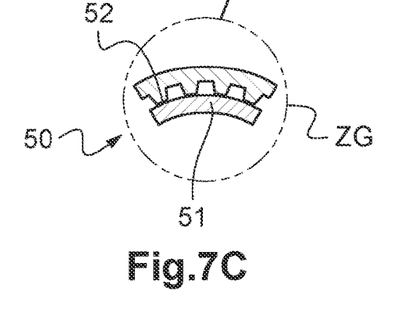

FIGS. 7-7C show a third degraded operating mode resulting from a breakage 602 of the driving shaft 10 at the lower segment. During said third degraded operating mode, the first main splines 31 continue to mesh with the second main splines 32. Conversely, no first backup spline 41 touches a second backup spline 42 and a second end-wall 44. In addition, no second backup spline 42 touches a first end-wall 43. The backup radial guide device 50 becomes active, the ring 51 of the backup radial device 50 touching at least one bearing face 52 at each instant.

Therefore, the driving shaft 10 transmits torque to the driven shaft 20 via the nominal spline coupling 30 as indicated by the dashed line 501. In addition, the driving shaft 10 is guided in rotation about the axis of rotation AX by the upper bearing 26 and optionally by the lower bearing 25 as indicated by the arrows 503, by the backup radial guide device 50 as indicated by the arrow 509, and by the nominal spline coupling 30. The driving shaft 10 is optionally guided longitudinally along the axis of rotation AX by the latch 60. The driven shaft 20 is guided in rotation about the axis of rotation AX; optionally by the nominal spline coupling 30 and by the planet wheels 77 as indicated by the arrows 505, and longitudinally along the axis of rotation AX by the axial abutment 800.

Naturally, the present invention may be subjected to numerous variations as to its implementation. Although several embodiments are described above, it can readily be understood that it is not conceivable to identify exhaustively all of the possible embodiments. It is naturally possible to envisage replacing any of the means described by equivalent means without going beyond the ambit of the present invention.

What is claimed is:

1. A torque transmission system comprising a driving shaft and a driven shaft, the driving shaft being hollow and mounted to move in rotation about an axis of rotation, the driving shaft extending longitudinally along the axis of rotation upwards from bottom to top in an elevation direction from a lower segment to an upper segment via an intermediate segment, the driven shaft comprising longitudinally a first segment extended by a second segment, the first segment being arranged inside the driving shaft, the second segment being arranged outside the driving shaft, and the transmission system further comprising an upper bearing co-operating with the upper segment and a lower bearing co-operating with the lower segment;

wherein the torque transmission system further comprises:

a nominal spline coupling comprising main splines on the intermediate segment that mesh with main splines on the first segment in a nominal operating mode without any failure;

a backup spline coupling between the driving shaft and the driven shaft, the backup spline coupling being arranged above the nominal spline coupling in the elevation direction and in view of the axis of rotation, and the backup spline coupling being inactive in the nominal operating mode; and a backup radial guide device between the driving shaft and the driven shaft, the backup radial guide device being arranged below the nominal spline coupling in the elevation direction and in view of the axis of rotation, and the backup radial guide device being inactive in the nominal operating mode.

2. The torque transmission system according to claim 1, wherein the intermediate segment includes a toothed wheel.

3. The torque transmission system according to claim 2, wherein the backup spline coupling is arranged longitudinally between the toothed wheel and the upper segment.

4. The torque transmission system according to claim 1, wherein the intermediate segment includes an upper coupling segment and a lower coupling segment, the upper coupling segment being constrained to move with the lower coupling segment and with the upper segment, the lower coupling segment being constrained to move with the lower segment, and the backup spline coupling co-operating with the upper coupling segment.

5. The torque transmission system according to claim 4, wherein the upper coupling segment and the upper segment form a first common, single piece, and the lower coupling segment and the lower segment form a second common, single piece, the upper coupling segment being fastened by a mechanical fastening to the lower coupling segment.

6. The torque transmission system according to claim 1, wherein the backup spline coupling comprises first backup splines constrained to move with the driving shaft or with the driven shaft, the backup spline coupling further comprising second backup splines constrained to move with that one of the driving shaft or driven shaft that does not have the first backup splines, circumferential clearance separating the first backup splines from the second backup splines in the nominal operating mode.

7. The torque transmission system according to claim 6, wherein the first backup splines have a tooth thickness that is less than the tooth thickness of the second backup splines, and the first backup splines are constrained to move with the driving shaft, the second backup splines being constrained to move with the driven shaft.

8. The torque transmission system according to claim 6, wherein with any two adjacent ones of the first backup splines being interconnected via a first end-wall and with any two adjacent ones of the second backup splines being interconnected via a second end-wall, in the nominal operating mode no first backup spline touches a second backup spline or a second end-wall, and no second backup spline touches a first end-wall.

9. The torque transmission system according to claim 6, wherein with any two adjacent ones of the first backup splines being interconnected via a first end-wall and with any two adjacent ones of the second backup splines being interconnected via a second end-wall, in the nominal operating mode: a circumferential clearance separates a side of each first backup spline from an adjacent second backup spline, a first radial gap separates each second backup spline from a respective first end-wall and a second radial gap separates each first backup spline from a respective second end-wall.

10. The torque transmission system according to claim 1, wherein the main splines on the intermediate segment and on the first segment comprise splines having rectilinear sides.

11. The torque transmission system according to claim 1, wherein the backup radial guide device comprises a ring of the driven shaft and at least one bearing face of the driving shaft, the at least one bearing face being separated from the ring in the nominal operating mode.

12. A main gearbox, wherein the main gearbox includes the torque transmission system according to claim 1.

13. A vehicle, wherein the vehicle includes the torque transmission system according to claim 1.

14. A torque transmission system comprising:
a driving shaft extending longitudinally along an axis of rotation upwards from bottom to top in an elevation direction from a lower segment to an upper segment with an intermediate segment extending between and connecting the lower segment to the upper segment of the driving shaft;
a hollow driven shaft mounted to move in rotation about the axis of rotation, the driven shaft comprising longitudinally a first segment connected to a second segment, the first segment disposed inside the driving shaft, the second segment disposed outside the driving shaft;
the transmission system further comprising an upper bearing co-operating with the upper segment and a lower bearing co-operating with the lower segment;
the torque transmission system further comprising:

a nominal spline coupling comprising main splines on the intermediate segment that mesh with main splines on the first segment in a nominal operating mode without any failure;
a backup spline coupling between the driving shaft and the driven shaft, the backup spline coupling disposed above the nominal spline coupling in the elevation direction and in view of the axis of rotation, the backup spline coupling being inactive in the nominal operating mode; and
a backup radial guide device disposed between the driving shaft and the driven shaft, the backup radial guide device disposed below the nominal spline coupling in the elevation direction and in view of the axis of rotation, and the backup radial guide device being inactive in the nominal operating mode.

15. The torque transmission system according to claim 14, wherein the intermediate segment includes a toothed wheel, the backup spline coupling disposed longitudinally between the toothed wheel and the upper segment.

16. The torque transmission system according to claim 14, wherein the intermediate segment includes an upper coupling segment and a lower coupling segment, the upper coupling segment constrained to move with the lower coupling segment and with the upper segment, the lower coupling segment constrained to move with the lower segment, and the backup spline coupling co-operating with the upper coupling segment.

17. The torque transmission system according to claim 16, wherein the upper coupling segment and the upper segment form a first common, single piece, and the lower coupling segment and the lower segment form a second common, single piece, the upper coupling segment being fastened by a mechanical fastening to the lower coupling segment.

18. The torque transmission system according to claim 14, wherein the backup spline coupling comprises first backup splines constrained to move with the driving shaft or with the driven shaft, the backup spline coupling further comprising second backup splines constrained to move with that one of the driving shaft or driven shaft that does not have the first backup splines, circumferential clearance separating the first backup splines from the second backup splines in the nominal operating mode.

19. A torque transmission system comprising a driving shaft and a driven shaft, the driving shaft being hollow and mounted to move in rotation about an axis of rotation, the driving shaft extending along the axis of rotation upwards from bottom to top in an elevation direction from a lower segment to an upper segment via an intermediate segment, the driven shaft comprising a first segment integrally connected to a second segment, the first segment arranged inside the driving shaft, the second segment arranged outside the driving shaft, and the transmission system further comprising an upper bearing co-operating with the upper segment and a lower bearing co-operating with the lower segment;
wherein the torque transmission system further comprises:
a nominal spline coupling comprising main splines on the intermediate segment that are active and mesh with main splines on the first segment in a nominal operating mode without any failure;
a backup spline coupling between the driving shaft and the driven shaft, the backup spline coupling being arranged above the nominal spline coupling in the elevation direction and in view of the axis of rotation, and the backup spline coupling being inactive in the nominal operating mode; and a backup radial guide device between the driving shaft and the driven shaft, the backup radial guide device being arranged below the nominal spline coupling in the elevation direction and in view of the axis of rotation, and the backup radial guide device being inactive in the nominal operating mode.

20. The torque transmission system according to claim 19, wherein the intermediate segment includes an upper coupling segment and a lower coupling segment, the upper coupling segment constrained to move with the lower coupling segment and with the upper segment, the lower coupling segment constrained to move with the lower segment, and the backup spline coupling co-operating with the upper coupling segment, wherein the upper coupling segment and the upper segment form a first common, single piece, and the lower coupling segment and the lower segment form a second common, single piece, the upper coupling segment being fastened by a mechanical fastening to the lower coupling segment, and wherein the backup spline coupling comprises first backup splines constrained to move with the driving shaft or with the driven shaft, the backup spline coupling further comprising second backup splines constrained to move with that one of the driving shaft or driven shaft that does not have the first backup splines, circumferential clearance separating the first backup splines from the second backup splines in the nominal operating mode.

* * * * *